United States Patent Office 2,934,669
Patented Apr. 26, 1960

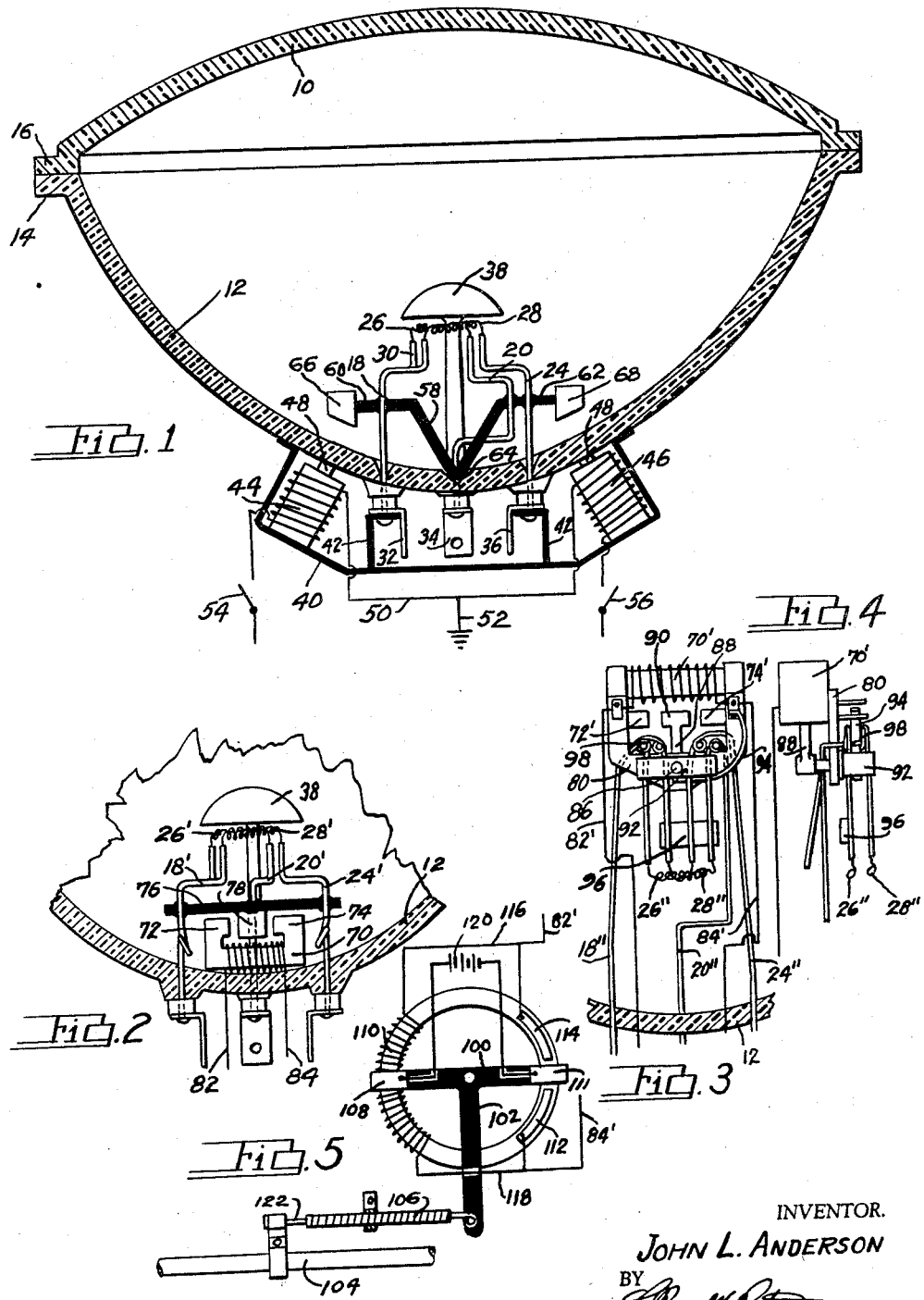

2,934,669

DIRIGIBLE LAMPS

John L. Anderson, Detroit, Mich.

Application March 21, 1957, Serial No. 647,552

4 Claims. (Cl. 313—152)

This invention relates to dirigible electrically generated light beams and more particularly to mechanism for changing the direction of a light beam without changing the body of the lamp or its reflector.

One application for such a device is in automobiles wherein steering wheels are moved in directions for steering the automobile around curves and which are provided with head lamps for night driving. Many attempts have been made to provide connections between the steering mechanism and head lamps which direct the lamps in the direction of steering so that the light follows the course of automobile travel.

It is an object of the present invention to provide a mechanism which will move the light beam horizontally in the direction transverse of the automobile travel without moving the lamp bulb.

More specifically stated another object of the invention is to translate an electrically charged filament in a lamp to vary its focal point on a reflector which may be a portion of the lamp bulb.

A further object of the invention is to provide a mechanism which is responsive to the action of an electrical current for moving the filament wires; the electrical current being controlled by the action of the steering mechanism of an automobile or controlled manually.

Other objects and advantages of the invention will more fully appear from the following detailed description of an illustrative embodiment of a device for obtaining the results of the invention, when taken in connection with the accompanying drawings in which:

Fig. 1 is a cross sectional view of a lamp body showing one form of a device for moving the lamp filaments, parts being shown in elevation;

Fig. 2 is a view corresponding to Fig. 1 but showing a modified form of the invention;

Fig. 3 is a fragmentary view of a further modification;

Fig. 4 is a view at right angles to Fig. 3; and

Fig. 5 is a view illustrating a means for controlling the electrical current supplied to devices shown in Figs. 2, 3 and 4.

Referring to the drawings, I have illustrated the invention as applied to an electrical head lamp of an automobile, here shown as being of the seal beam type, but not necessarily limited thereto and not necessarily limited to automobile head lamps.

The lamp selected for illustrating the invention comprises a bulb having a lens 10 and a reflector 12 formed from glass. The lamp bulb is positioned on the automobile by supports to the sealed flanges 14 and 16 on the respective lens 10 and reflector 12. At the central rear portion of the reflector 12 are electrical conductor wires 18, 20 and 24 for filaments 26 and 28 spaced forwardly of the rear surface of the reflector 12. The one conductor 18 is connected to a conductor 30 for supplying current to one side of the filament 26 and the other side of the filament 26 is connected to the conductor 20. The conductor 18 is connected to the filament 28 and the other side of the filament 28 is connected to the conductor 24.

The two filaments 26 and 28 are spaced apart, one above the other, for producing a high and low beam and, as herein illustrated, the one filament 26 is located to the left of a central line through the reflector for projecting the light beam to one isde of central line, as is customary for lighting one side of the road more than the other. The conductors 18, 20 and 24 are formed in the reflector body and pass through the glass and are connected to terminal connections 32, 34 and 36 at the rear of the reflector. To prevent the direct exposure of the filaments to view a guard 38 is provided in front of the filaments.

I have provided a means for shifting the filaments laterally responsive to the movements of the steering mechanism or which may be manually controlled. One form of the device, illustrated in Fig. 1, comprises a bracket 40 adapted to be secured to the external rear surface of the reflector body by flanges 42 secured to the face of the reflector body by flanges 42 secured to the terminal connections 32 and 36. These flanges may be made of electrical insulation material to prevent conduction of electricity to the bracket 40. The bracket 40 supports two solenoids 44 and 46 each at the opposite sides of the center line through the reflector. The cores 48 of the solenoids are positioned adjacent the rear of the reflector 12 and the field windings at one end of each are connected together at 50 and to a ground connection 52. The other ends of the field each lead to switches 54 and 56 which, as shown, are manually controlled but may be controlled by the steering mechanism, hereinafter more fully described. An electrical insulation bar 58, having oppositely extending arms 60 and 62, is pivoted in the center of the reflector 12, as at 64. The arms 60 and 62 are supported by and fixed to an intermediate portion of the electrical conductor wires 18, 20 and 24. At the outer ends of the arms 60 and 62 are metallic members 66 and 68 which are opposite the cores 48 but on the inner or opposite side of the reflector 12 and spaced therefrom. When the solenoid 44 is energized a magnetic force draws the member 66 toward its adjacent core 48 rocking the bar 58 which causes the wires 18, 20 and 24 to be moved to the left. When the solenoid 68 is energized a magnetic force draws the member 68 toward its adjacent core 48 rocking the bar 58 in the opposite direction causing the wires 18, 20 and 24 to move to the right. Thus the filaments 26 and 28 can be moved from a normal central position to opposite sides of a central line for directing the light rays to the left or right without movement of the lamp bulb.

Referring to Fig. 2, a modified form of the device has been illustrated and described, wherein an electromagnet 70 has been shown within the reflector body. The electromagnet has two poles 72 and 74 arranged at opposite sides of the central line of the reflector. Reversal of the current flow through the field will alternate the magnetic force from one pole to the other. In this form of the device an electrical insulating bar 76 is suspended and secured to the electrical wires 18', 20' and 24' leading to the filaments 26' and 28'. A metallic member 78, preferably of soft iron, is suspended from the bar 76 and is normally positioned between and in spaced relation to the two poles 72 and 74. When the field of the electromagnet 70 is electrically energized, through lead wires 82 and 84, the metallic member 78 is drawn toward one of the poles 72 or 74 depending upon the direction of current flow. The bar 76 is moved with the metallic member 78 moving the wires 18', 20' and 24' and consequently the filaments 26' and 28' to the left or right.

In the form of the device illustrated in Figs. 3 and 4, the device is located in front of the filaments serving as a means for preventing the direct exposure of the filaments to view thereby replacing the guard 38 which is shown in Figs. 1 and 2. An electromagnet 70', similar to the electromagnet 70 shown in Fig. 2, is supported on a U shaped bracket 80 which in turn is supported by the conductor wires 18", 20" and 24". The electromagnet 70' is insulated from the bracket 80 and is provided with two poles 72' and 74' and is energized by a reversible current through lead wires 82' and 84' which also support the bracket 80. Pivotally mounted at 86 is an arm 88 of insulating material carried by the bracket 80. A metallic member 90 is located on the end of the arm 88 and is normally positioned between and in spaced relation to the poles 72' and 74'. An insulation block 92 is secured to the pivoted end of the arm 88, to rock therewith, and carries extensions of the conductor wires 18", 20" and 24" to the filaments 26" and 28". A spring 94, cooperating between the bracket 80 and block 92, urges the arm 88 to its central or normal position. There is also provided a balance weight 96 secured to the filament extension leads. When the field of the electromagnet 70' is electrically energized, through lead wires 82' and 84', the metallic member 90 is drawn toward one of the poles 72' or 74' depending upon the direction of current flow. The block 92 is pivoted moving the filament extension leads and filaments 26" and 28" to the left or right. Loops 98 may be provided to give more flexibility to the filament conductor wires 18", 20" and 24".

As a means for controlling the electrical energy supplied to the electromagnets 70 and 70' by the steering mechanism, I have selected a two way rheostat for controlling the direction of the swinging filaments. A rotatable contact member 100 having a radially extending arm 102 is moved in an arc by the steering cross rod 104 through a flexible cable 106. The lead wire 82' is connected to one side of the resistance coil 110 and the contact 114, and the other lead wire is connected to the opposite end of the resistance coil 110. A battery 120 supplies electrical energy to contacts 108 and 111, carried by the rotatable member 100, having a radially extending arm 102. The arm 102 and member 100 is pivotally movable causing the contacts 108 and 111 to swing across the resistance coil 110 and make contact with either the contacts 112 or 114. The pivotal movement of the member 100 is caused by movement of the steering cross rod or drag link 104 connected to the arm 102 by a flexible outer cable 106 and internal wire 122. The rotatable member 100 is shown in its neutral position between the spaced contacts 112 and 114. When the member 100 is rotated in a clockwise direction the contact 111 engages the contact 112 and the contact 108 engages the resistance coil 110. When moved in a counter clockwise direction the contact 108 engages the resistance coil 110, thus conducting a variable resistance and in opposite directions to the electromagnets 70 or 70' through the lead wires 82' and 84'.

From the above, it will be understood that by any one of the above disclosures, the direction of the light beam is directed from one side of a central focal point to the other, either manually controlled or by the action of the steering mechanism, without movement of the lamp bulb. The beam is directed by control of the filament within the lamp bulb and the movement of the filament with respect to the reflector.

The forms shown for illustrating a means for control are illustrative only and are not to be construed as limitations to the invention other than by the meaning of the terms of the appended claims.

I claim:

1. A sealed beam lamp bulb having a lens, a reflector spaced from said lens, and an electrically energized filament spaced from said reflector and between said lens and said reflector, and electromagnetic means for shifting the position of said filament relative to said reflector, said electromagnetic means being located between said lens and said reflector.

2. A sealed beam lamp bulb having a lens, a reflector spaced from said lens, and an electrically energized filament spaced from said reflector and between said lens and said reflector, and electromagnetic means for shifting the position of said filament relative to said reflector, said electromagnetic means being located between said filament and said reflector.

3. A lamp body having a lens, a reflector spaced from said lens, and a filament spaced from said reflector and between said lens and reflector, electrical conducting wires supporting said filament fixed to and passing through said reflector, an electrical insulation member connecting said conducting wires intermediate said reflector and said filament, metallic means carried by said insulation member, and electromagnetic means for shifting said metallic means and said insulation member to thereby shift said filament.

4. A device of the class described comprising, a lamp, an electrically energized filament within said lamp, lead wires extending from said reflector to said filament, an insulation member connecting said filament lead wires, said insulation member provided with metallic means at its opposite ends, and electromagnetic means for moving said metallic means and said insulation member to cause movement of said filament.

References Cited in the file of this patent

UNITED STATES PATENTS

| | | |
|---|---|---|
| 798,954 | Francis | Sept. 5, 1905 |
| 1,209,155 | Heard | Dec. 19, 1916 |
| 1,269,426 | Green | June 11, 1918 |
| 2,002,295 | Melish | Nov. 26, 1935 |
| 2,152,836 | Bovey | Apr. 4, 1939 |
| 2,156,369 | Bay | May 2, 1939 |
| 2,317,027 | Butler | Apr. 20, 1943 |